(12) United States Patent
Wilson

(10) Patent No.: US 6,510,382 B2
(45) Date of Patent: Jan. 21, 2003

(54) METHOD FOR OBTAINING PRECISION ROAD MAPS

(75) Inventor: Christopher K. H. Wilson, Redwood City, CA (US)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/769,762

(22) Filed: Jan. 26, 2001

(65) Prior Publication Data

US 2002/0014979 A1 Feb. 7, 2002

Related U.S. Application Data

(60) Provisional application No. 60/178,199, filed on Jan. 26, 2000.

(51) Int. Cl.⁷ .............................................. G01C 21/00
(52) U.S. Cl. ........................ 701/208; 701/210; 701/214; 340/988
(58) Field of Search ................................ 701/200, 201, 701/202, 208, 214, 210; 340/988

(56) References Cited

U.S. PATENT DOCUMENTS

| | | | | |
|---|---|---|---|---|
| 4,984,168 A | * | 1/1991 | Neukrichner et al. | 701/210 |
| 5,521,826 A | * | 5/1996 | Matsumoto | 701/208 |
| 5,731,978 A | * | 3/1998 | Tamai et al. | 701/201 |
| 5,752,217 A | * | 5/1998 | Ishizaki et al. | 701/201 |
| 6,018,697 A | * | 1/2000 | Morimoto et al. | 701/209 |
| 6,128,574 A | * | 10/2000 | Diekhans | 701/209 |
| 6,192,314 B1 | * | 2/2001 | Khavakh et al. | 701/209 |

* cited by examiner

Primary Examiner—William A. Cuchlinski, Jr.
Assistant Examiner—Marthe Marc-Coleman
(74) Attorney, Agent, or Firm—Crowell & Moring LLP

(57) ABSTRACT

A highly precise digital road map and method of producing same are provided for vehicle applications. The method obtains a conventional digital map having traditional segments and nodes, and represents a road network of the precision digital road map as a set of geometric shapes indexed to the traditional segments and nodes of the conventional digital map. Branch and merge points are identified on the road network by divergences and convergences from ideal paths of the vehicles traveling thereon. These ideal paths are obtained by statistically combining the actual paths of the vehicles traveling between the same points.

9 Claims, 1 Drawing Sheet

METHOD FOR OBTAINING PRECISION ROAD MAPS

REFERENCE TO PROVISIONAL APPLICATION

This application claims the benefit of prior filed co-pending provisional application Ser. No. 60/178,199, filed on Jan. 26, 2000, pursuant to 35 U.S.C. §119(e).

BACKGROUND AND SUMMARY OF THE INVENTION

The invention relates to digital road maps and, more particularly, to a method for producing highly precise digital road maps for use with vehicle applications.

The current generation of digital maps all use the so-called "segment and node" approach, wherein every road segment begins and ends at a node. Many attributes of the road can only be changed at the nodes, and all intersections are described as nodes. The nodes represent a physical reality, in other words, the place at which something in the road network actually changes. For example, nodes may be start points and end points of a bridge, while the segment is the actual distance traversed by the bridge. Current digital maps of this type are commercially available from companies such as Navtech, TeleAtlas and ETAK.

In real-life, however, roads themselves do not intersect at points. The center lines of the vehicle lanes in a road may intersect at a point, but using many nodes per intersection is inconsistent with current models, as well as being very complex.

There is therefore needed a highly precise digital road map and method of producing same which can provide precise details of the lane positions and other attributes. Such highly precise road maps are necessary for the next generation of applications of these maps within the vehicle, such as control systems for the vehicle based on the maps.

The present invention meets these needs by providing digital maps produced by representing the road and lane network as a set of geometric shapes (such as lanes) that are associated with traditional nodes and segments for indexing purposes only. In this representation, the nodes and segments have no physical meaning with respect to the map.

According to the present invention, the map representation uses segments and nodes merely as indexes into a more complex structure. Advantageously, branch and merge points of the road network are defined not by a physical structure but by the divergence of actual, statistical paths of vehicles. In this regard, Applicants advantageously define a path (segment) as the root of a group of people, all traveling from point A to point B, where point B is indicated not by a defined physical location, but rather by the driver's thought processes with respect to operation of the vehicle. In this manner, the respective points such as point B are reflected by the driver's driving behavior as measured via the driving dynamics and the vehicle location relative to fixed landmarks.

Other objects, advantages and novel features of the present invention will become apparent from the following detailed description of the invention when considered in conjunction with the accompanying drawings.

DETAILED DESCRIPTION OF THE DRAWING

Figure 1:
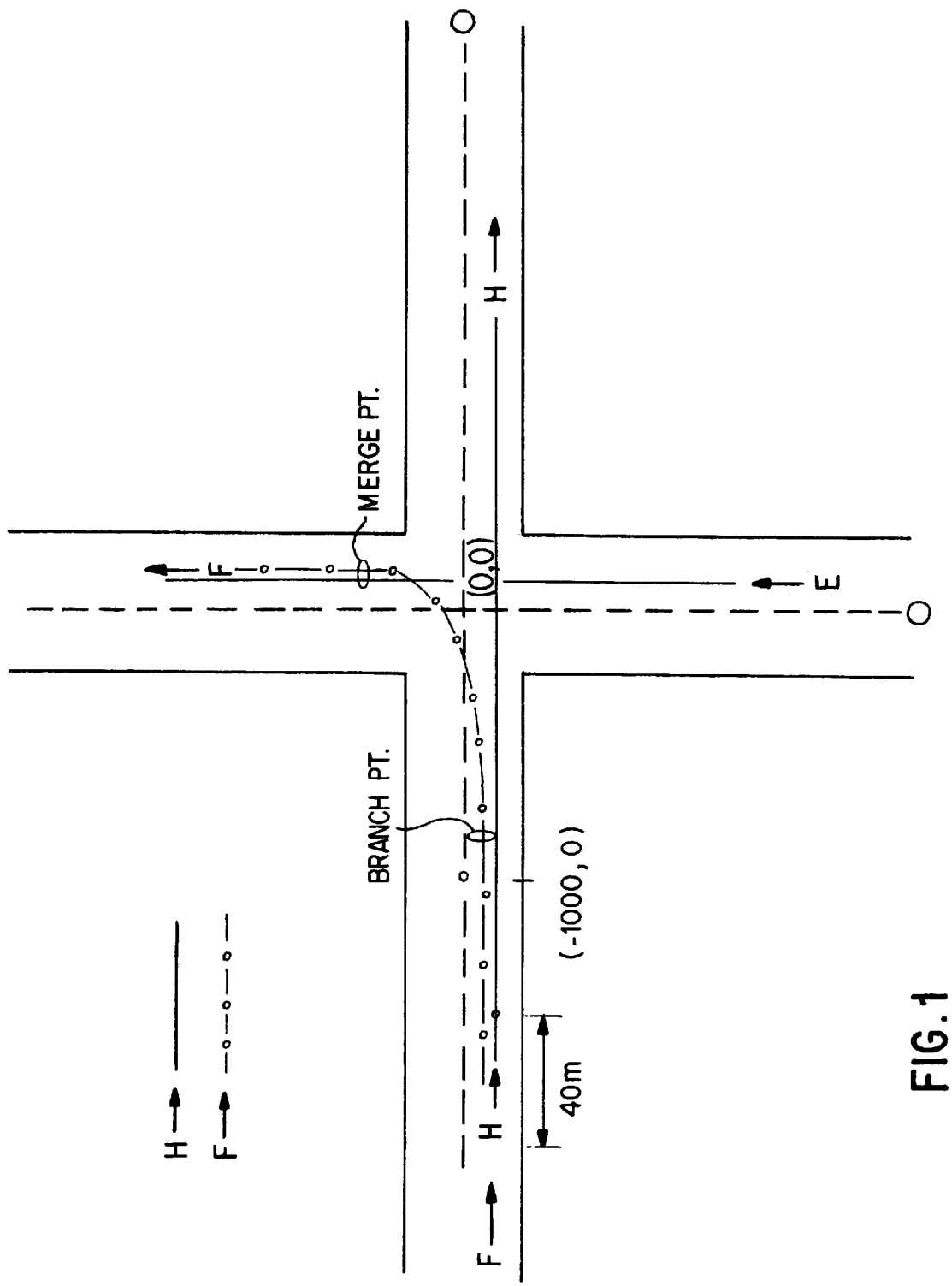
FIG. 1 is a diagram illustrating the branch and merge points according to the present invention in conjunction with a road intersection.

It is recognized that driving consists of several activities. At the highest level, a driver is involved in the route planning, while at some intermediate level the driver may adjust the vehicle speed to avoid other vehicles or to open or fill a gap in the traffic flow. In view of this, geometry refinement algorithms rely on the fact that at a lower level, drivers are conducting very basic tasks, such as lane following or turning from one road to another in an intersection. These tasks are generally independent of the environment, i.e., the presence of other vehicles. It can therefore generally be hypothesized that all people are trying to follow a fixed, imaginary line on the road to within a personal tolerance when trying to follow a vehicle lane. This fixed, imaginary line can therefore be defined as the ideal path. Even when a driver is turning a corner, there is some ideal path that represents a transition from a given lane on a given road, to a given lane on another road.

In general, a driver always faces the low level problem of getting from point A to point B, where B is only a few tens of meters ahead. There are many drivers who pass through point A, e.g., the center of a lane, and want to get to point B, e.g., the lane center 40 meters down the road. These drivers can all be hypothesized to be following the same ideal path. The geometry refinement algorithms therefore attempt to find that same ideal path by statistically combining the paths of all drivers going from point A to point B.

With this approach according to the invention, the geometry refinement problem becomes one of identifying all drivers going from point A to point B, versus those going from, say, point A to point C. Once this is done, a common statistical algorithm can be used. The following map description is designed to reflect this approach.

As an example of this referring to FIG. 1, assume two drivers H and F are driving down a long road approaching an intersection where H will go straight, and F will turn left. When they are 1,000 meters from the intersection, both H and F are focused on getting to the center of the lane, perhaps 40 meters ahead. At some point, however, their tasks diverge. H is still concentrating on a point 40 meters ahead, but F is working on getting onto the intersecting road. At this point their two paths have diverged, at what is called a branch point, and they should no longer be combined for geometry refinement. Conversely, after passing through the intersection, F's task, and current position will be identical with another driver E who had passed straight through the intersection in the opposite way. This therefore becomes a merge point and the paths can now be combined.

There are, however, some driving tasks that do not lend themselves to groupings. The task of changing lanes can occur at any point along a road. If A is the starting place (the center of lane 1) and B the destination (the center of lane 2, 30 meters down the road) there will be very few drivers with the same A to B task, each driver will have a different A or B. The geometry refinement task excludes these unique tasks, and merely notes that a lane change is possible in the approximate area of the observed lane exchange.

In order to simplify the geometry representation task, less accurate digital maps, such as those provided by Navtech, are used for identifiers and network information. All paths are referenced by the Navtech segment ID's. The Navtech utilities thus provide a method for quickly identifying paths in a given area, and for doing high level routing. However, beyond a fairly rough index into the refined path geometry (based on segment and node ID's), the Navtech map is not used as a reference.

In order to subdivide paths into reasonable segments, paths are cut arbitrarily at their point of closest approach to a Navtech node. In addition, there are many paths that exist only within an intersection (e.g. turning paths) that may be associated with a Navtech node, and not with a Navtech segment. The assignment of paths to segments or nodes is somewhat arbitrary. While branch and merge points do not necessarily have any connection with a Navtech node, each branch and merge point according to the invention is associated with a nearby node that contains structures for determining branching probabilities. Therefore, when modeling the complete path network in an area, all nearby segments and nodes must be queried for relevant information. This approach, of using as little of the Navtech map information as possible, advantageously de-couples the refined map database from any existing geometry errors in the Navtech database.

Maps of this type using branch and merge points that are associated with traditional nodes and segments for indexing purposes only will enable many new vehicle safety and convenience applications over the next 20 years.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a precision digital road map for vehicle applications, the method comprising the acts of:
   obtaining a conventional digital map having traditional segments and nodes;
   representing a road network of the precision digital road map as a set of geometric shapes indexed to the traditional segments and nodes;
   wherein the act of representing comprises the act of identifying branch and merge points of the road network by divergences and convergences, respectively, from ideal paths of vehicles; and
   wherein the ideals paths are obtained by statistically combining the actual paths of vehicles traveling between the same points.

2. The method according to claim 1, wherein the act of statistically combining uses a geometry refinement algorithm.

3. The method according to claim 1, wherein each identified branch and merge point is associated with a nearby one of the traditional nodes of the conventional digital map containing attribute information.

4. A method for producing a precision digital road map for vehicle applications, the method comprising the acts of:
   obtaining a conventional digital map having traditional segments and nodes;
   representing a road network of the precision digital road map as a set of geometric shapes indexed to the traditional segments and nodes;
   wherein the act of representing comprises the act of identifying branch and merge points of the road network by divergences and convergences, respectively, from ideal paths of vehicles; and
   wherein an ideal path is defined as a root of a group of drivers, all traveling between point one and point two, where point two represents a driver's perceived destination while driving.

5. A precision digital road map, comprising:
   a road network represented as a set of geometric shapes indexed to traditional segments and nodes of a conventional digital map;
   wherein branch and merge points of the road network are identified by divergences and convergences, respectively, from ideal paths of vehicles, said ideal paths being statistical combinations of actual paths of vehicles traveling between the same points.

6. The precision digital road map according to claim 5, wherein each identified branch and merge point is associated with a nearby one of the traditional nodes of the conventional digital map containing attribute information.

7. The precision digital road map according to claim 5, wherein an ideal path is defined as a root of a group of drivers, all traveling between point one and point two, where point two represents a driver's perceived destination while driving.

8. The precision digital road map according to claim 5, wherein the geometric shapes comprise road lanes traveled by the vehicles.

9. A method for producing a precision digital road map for vehicle applications, the method comprising the acts of:
   obtaining a conventional digital map having traditional segments and nodes; and
   representing a road network of the precision digital road map as a set of geometric shapes indexed to the traditional segments and nodes, which traditional segments and nodes have substantially no physical meaning in the precision digital road map.

* * * * *